(12) United States Patent
Arisawa

(10) Patent No.: US 11,899,997 B1
(45) Date of Patent: Feb. 13, 2024

(54) IMAGE ARRANGEMENT APPARATUS AND IMAGE FORMING APPARATUS, IMAGE ARRANGEMENT METHOD, AND COMPUTER READABLE STORAGE MEDIUM

(71) Applicant: CANON KABUSHIKI KAISHA, Tokyo (JP)

(72) Inventor: Yuuki Arisawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/341,110

(22) Filed: Jun. 26, 2023

(30) Foreign Application Priority Data

Jul. 22, 2022 (JP) .................................. 2022-117043

(51) Int. Cl.
G06F 3/12 (2006.01)

(52) U.S. Cl.
CPC .......... G06F 3/1242 (2013.01); G06F 3/1208 (2013.01); G06F 3/1252 (2013.01); G06F 3/1254 (2013.01)

(58) Field of Classification Search
CPC ...... G06F 3/1208; G06F 3/1242; G06F 3/125; G06F 3/1251; G06F 3/1252; G06F 3/1254
USPC .................................................. 358/1.15, 1.18
See application file for complete search history.

(56) References Cited

U.S. PATENT DOCUMENTS 9,904,494 B2 * 2/2018 Ujike ................... G06K 15/186
10,289,363 B2 * 5/2019 Kibune ................. G06F 3/1251

FOREIGN PATENT DOCUMENTS

JP 2005275682 A 10/2005

OTHER PUBLICATIONS

"TX-3000 Online Manual Mac JPV02" Canon. pp 252-253. English translation provided. http://gdlp01.c-wss.com/gds/5/0300029125/02/TX-3000_OnlineManual_Mac_JP_V02.pdf under titled of "[Use of Nesting Function] and [Automatic Rotation]" (searched on Jun. 2, 2022). Cited in the Specification.

* cited by examiner

*Primary Examiner* — Kent Yip
(74) *Attorney, Agent, or Firm* — ROSSI, KIMMS & McDOWELL LLP

(57) ABSTRACT

An embodiment of the present disclosure is an image arrangement apparatus that arranges images for nesting printing, including: an arrangement unit configured to arrange the images side by side in the main scanning direction such that either one of a long side direction and a short side direction of each image included in the images coincides with the main scanning direction in accordance with a combination of respective rotations of images and also such that the images are contained in a rectangular region defined based on the combination; a calculation unit configured to calculate an area of a margin that is a part of the rectangular region, wherein the part is where the images arranged by the arrangement unit are not present; and a selection unit configured to select one of a the combinations based on the area of the margin corresponding to each combination.

21 Claims, 20 Drawing Sheets

FIG.5A

| IMAGE DATA ID | SHORT SIDE LENGTH | LONG SIDE LENGTH | MAIN SCANNING ORIENTATION |
|---|---|---|---|
| 611 | 4 | 5 | SHORT SIDE |

| IMAGE DATA ID | SHORT SIDE LENGTH | LONG SIDE LENGTH | MAIN SCANNING ORIENTATION |
|---|---|---|---|
| 611 | 4 | 5 | SHORT SIDE |
| 612 | 5 | 7 | SHORT SIDE |

FIG.5C

| IMAGE DATA ID | SHORT SIDE LENGTH | LONG SIDE LENGTH | MAIN SCANNING ORIENTATION |
|---|---|---|---|
| 611 | 4 | 5 | SHORT SIDE |
| 612 | 5 | 7 | SHORT SIDE |
| 613 | 3 | 5 | SHORT SIDE |
| 614 | 2 | 4 | SHORT SIDE |
| 615 | 4 | 6 | SHORT SIDE |
| 616 | 2 | 5 | SHORT SIDE |

FIG.5D

| IMAGE DATA ID | SHORT SIDE LENGTH | LONG SIDE LENGTH | MAIN SCANNING ORIENTATION |
|---|---|---|---|
| 611 | 4 | 5 | SHORT SIDE |
| 612 | 5 | 7 | LONG SIDE |
| 613 | 3 | 5 | SHORT SIDE |
| 614 | 2 | 4 | SHORT SIDE |
| 615 | 4 | 6 | SHORT SIDE |
| 616 | 2 | 5 | SHORT SIDE |

| 801 | 802 | 803 | 804 | 805 | 806 | 807 | 808 | 809 | 810 | 880 |
|---|---|---|---|---|---|---|---|---|---|---|
| COMBI-NATION ID | MAIN SCANNING ORIENTATION OF IMAGE DATA 611 | MAIN SCANNING ORIENTATION OF IMAGE DATA 612 | MAIN SCANNING ORIENTATION OF IMAGE DATA 613 | MAIN SCANNING ORIENTATION OF IMAGE DATA 614 | MAIN SCANNING ORIENTATION OF IMAGE DATA 615 | MAIN SCANNING ORIENTATION OF IMAGE DATA 616 | MAXIMUM IMAGE HEIGHT | TOTAL IMAGE WIDTH | MOUNTED IMAGE NUMBER | MARGIN AREA |
| 811 | SHORT SIDE | SHORT SIDE | SHORT SIDE | SHORT SIDE | SHORT SIDE | SHORT SIDE | 0 | 0 | 0 | N/A |
| 812 | LONG SIDE | SHORT SIDE | SHORT SIDE | SHORT SIDE | SHORT SIDE | SHORT SIDE | 0 | 0 | 0 | N/A |
| 813 | SHORT SIDE | LONG SIDE | SHORT SIDE | SHORT SIDE | SHORT SIDE | SHORT SIDE | 0 | 0 | 0 | N/A |
| 814 | LONG SIDE | LONG SIDE | SHORT SIDE | SHORT SIDE | SHORT SIDE | SHORT SIDE | 0 | 0 | 0 | N/A |
| ... | | | | | | | | | | |
| 834 | SHORT SIDE | LONG SIDE | LONG SIDE | SHORT SIDE | SHORT SIDE | LONG SIDE | 0 | 0 | 0 | N/A |
| ... | | | | | | | | | | |
| 874 | LONG SIDE | LONG SIDE | LONG SIDE | LONG SIDE | LONG SIDE | LONG SIDE | 0 | 0 | 0 | N/A |

FIG.8

| 801 | 802 | 803 | 804 | 805 | 806 | 807 | 808 | 809 | 810 | 880 |
|---|---|---|---|---|---|---|---|---|---|---|
| COMBI-NATION ID | MAIN SCANNING ORIENTATION OF IMAGE DATA 611 | MAIN SCANNING ORIENTATION OF IMAGE DATA 612 | MAIN SCANNING ORIENTATION OF IMAGE DATA 613 | MAIN SCANNING ORIENTATION OF IMAGE DATA 614 | MAIN SCANNING ORIENTATION OF IMAGE DATA 615 | MAIN SCANNING ORIENTATION OF IMAGE DATA 616 | MAXIMUM IMAGE HEIGHT | TOTAL IMAGE WIDTH | MOUNTED IMAGE NUMBER | MARGIN AREA |
| 811 | SHORT SIDE | SHORT SIDE | SHORT SIDE | SHORT SIDE | SHORT SIDE | SHORT SIDE | 5 | 4 | 1 | N/A |
| ... | | | | | | | | | | |

| 801 | 802 | 803 | 804 | 805 | 806 | 807 | 808 | 809 | 810 | 880 |
|---|---|---|---|---|---|---|---|---|---|---|
| COMBI-NATION ID | MAIN SCANNING ORIENTATION OF IMAGE DATA 611 | MAIN SCANNING ORIENTATION OF IMAGE DATA 612 | MAIN SCANNING ORIENTATION OF IMAGE DATA 613 | MAIN SCANNING ORIENTATION OF IMAGE DATA 614 | MAIN SCANNING ORIENTATION OF IMAGE DATA 615 | MAIN SCANNING ORIENTATION OF IMAGE DATA 616 | MAXIMUM IMAGE HEIGHT | TOTAL IMAGE WIDTH | MOUNTED IMAGE NUMBER | MARGIN AREA |
| 811 | SHORT SIDE | SHORT SIDE | SHORT SIDE | SHORT SIDE | SHORT SIDE | SHORT SIDE | 7 | 20 | 6 | N/A |
| ... | | | | | | | | | | |

| 801 | 802 | 803 | 804 | 805 | 806 | 807 | 808 | 809 | 810 | 880 |
|---|---|---|---|---|---|---|---|---|---|---|
| COMBI-NATION ID | MAIN SCANNING ORIENTATION OF IMAGE DATA 611 | MAIN SCANNING ORIENTATION OF IMAGE DATA 612 | MAIN SCANNING ORIENTATION OF IMAGE DATA 613 | MAIN SCANNING ORIENTATION OF IMAGE DATA 614 | MAIN SCANNING ORIENTATION OF IMAGE DATA 615 | MAIN SCANNING ORIENTATION OF IMAGE DATA 616 | MAXIMUM IMAGE HEIGHT | TOTAL IMAGE WIDTH | MOUNTED IMAGE NUMBER | MARGIN AREA |
| 811 | SHORT SIDE | SHORT SIDE | SHORT SIDE | SHORT SIDE | SHORT SIDE | SHORT SIDE | 7 | 20 | 6 | 28 |
| 812 | LONG SIDE | SHORT SIDE | SHORT SIDE | SHORT SIDE | SHORT SIDE | SHORT SIDE | 7 | 19 | 5 | N/A |
| ... | | | | | | | | | | |

FIG.11

| COMBI-NATION ID | MAIN SCANNING ORIENTATION OF IMAGE DATA 611 | MAIN SCANNING ORIENTATION OF IMAGE DATA 612 | MAIN SCANNING ORIENTATION OF IMAGE DATA 613 | MAIN SCANNING ORIENTATION OF IMAGE DATA 614 | MAIN SCANNING ORIENTATION OF IMAGE DATA 615 | MAIN SCANNING ORIENTATION OF IMAGE DATA 616 | MAXIMUM IMAGE HEIGHT | TOTAL IMAGE WIDTH | MOUNTED IMAGE NUMBER | MARGIN AREA |
|---|---|---|---|---|---|---|---|---|---|---|
| 811 | SHORT SIDE | SHORT SIDE | SHORT SIDE | SHORT SIDE | SHORT SIDE | SHORT SIDE | 7 | 20 | 6 | 28 |
| 812 | LONG SIDE | SHORT SIDE | SHORT SIDE | SHORT SIDE | SHORT SIDE | SHORT SIDE | 7 | 21 | 5 | N/A |
| ... | | | | | | | | | | |

FIG.12

| 801 | 802 | 803 | 804 | 805 | 806 | 807 | 808 | 809 | 810 | 880 |
|---|---|---|---|---|---|---|---|---|---|---|
| COMBI-NATION ID | MAIN SCANNING ORIENTATION OF IMAGE DATA 611 | MAIN SCANNING ORIENTATION OF IMAGE DATA 612 | MAIN SCANNING ORIENTATION OF IMAGE DATA 613 | MAIN SCANNING ORIENTATION OF IMAGE DATA 614 | MAIN SCANNING ORIENTATION OF IMAGE DATA 615 | MAIN SCANNING ORIENTATION OF IMAGE DATA 616 | MAXIMUM IMAGE HEIGHT | TOTAL IMAGE WIDTH | MOUNTED IMAGE NUMBER | MARGIN AREA |
| 811 | SHORT SIDE | SHORT SIDE | SHORT SIDE | SHORT SIDE | SHORT SIDE | SHORT SIDE | 7 | 20 | 6 | 28 |
| 812 | LONG SIDE | SHORT SIDE | SHORT SIDE | SHORT SIDE | SHORT SIDE | SHORT SIDE | 7 | 21 | 5 | 38 |
| 813 | SHORT SIDE | LONG SIDE | SHORT SIDE | SHORT SIDE | SHORT SIDE | SHORT SIDE | 6 | 22 | 5 | N/A |
| ... | | | | | | | | | | |

FIG.13

| IMAGE DATA ID | SHORT SIDE LENGTH | LONG SIDE LENGTH | MAIN SCANNING ORIENTATION |
|---|---|---|---|
| 611 | 4 | 5 | SHORT SIDE |
| 612 | 5 | 7 | SHORT SIDE |
| 613 | 3 | 5 | SHORT SIDE |
| 614 | 2 | 4 | SHORT SIDE |

FIG.14A

| IMAGE DATA ID | SHORT SIDE LENGTH | LONG SIDE LENGTH | MAIN SCANNING ORIENTATION |
|---|---|---|---|
| 611 | 4 | 5 | SHORT SIDE |
| 612 | 5 | 7 | LONG SIDE |
| 613 | 3 | 5 | SHORT SIDE |
| 614 | 2 | 4 | SHORT SIDE |

FIG.14B

| COMBINATION ID 1501 | MAIN SCANNING ORIENTATION OF IMAGE DATA 611 1502 | MAIN SCANNING ORIENTATION OF IMAGE DATA 612 1503 | MAIN SCANNING ORIENTATION OF IMAGE DATA 613 1504 | MAIN SCANNING ORIENTATION OF IMAGE DATA 614 1505 | MAXIMUM IMAGE HEIGHT 1506 | TOTAL IMAGE WIDTH 1507 | MOUNTED IMAGE NUMBER 1508 | MARGIN AREA 1509 |
|---|---|---|---|---|---|---|---|---|
| 1511 | SHORT SIDE | SHORT SIDE | SHORT SIDE | SHORT SIDE | 0 | 0 | 0 | N/A |
| 1512 | LONG SIDE | SHORT SIDE | SHORT SIDE | SHORT SIDE | 0 | 0 | 0 | N/A |
| 1513 | SHORT SIDE | LONG SIDE | SHORT SIDE | SHORT SIDE | 0 | 0 | 0 | N/A |
| 1514 | LONG SIDE | LONG SIDE | SHORT SIDE | SHORT SIDE | 0 | 0 | 0 | N/A |
| ... | | | | | | | | |
| 1517 | SHORT SIDE | LONG SIDE | LONG SIDE | SHORT SIDE | 0 | 0 | 0 | N/A |
| 1518 | LONG SIDE | LONG SIDE | LONG SIDE | SHORT SIDE | 0 | 0 | 0 | N/A |
| ... | | | | | | | | |
| 1521 | SHORT SIDE | LONG SIDE | SHORT SIDE | LONG SIDE | 0 | 0 | 0 | N/A |
| 1522 | LONG SIDE | LONG SIDE | SHORT SIDE | LONG SIDE | 0 | 0 | 0 | N/A |
| ... | | | | | | | | |
| 1525 | SHORT SIDE | LONG SIDE | LONG SIDE | LONG SIDE | 0 | 0 | 0 | N/A |
| 1526 | LONG SIDE | LONG SIDE | LONG SIDE | LONG SIDE | 0 | 0 | 0 | N/A |

FIG.15

| 1501 | 1502 | 1503 | 1504 | 1505 | 1506 | 1507 | 1508 | 1509 |
|---|---|---|---|---|---|---|---|---|
| COMBINATION ID | MAIN SCANNING ORIENTATION OF IMAGE DATA 611 | MAIN SCANNING ORIENTATION OF IMAGE DATA 612 | MAIN SCANNING ORIENTATION OF IMAGE DATA 613 | MAIN SCANNING ORIENTATION OF IMAGE DATA 614 | MAXIMUM IMAGE HEIGHT | TOTAL IMAGE WIDTH | MOUNTED IMAGE NUMBER | MARGIN AREA |
| 1511 | SHORT SIDE | SHORT SIDE | SHORT SIDE | SHORT SIDE | 5 | 4 | 1 | N/A |
| ... | | | | | | | | |

| 1501 | 1502 | 1503 | 1504 | 1505 | 1506 | 1507 | 1508 | 1509 |
|---|---|---|---|---|---|---|---|---|
| COMBINATION ID | MAIN SCANNING ORIENTATION OF IMAGE DATA 611 | MAIN SCANNING ORIENTATION OF IMAGE DATA 612 | MAIN SCANNING ORIENTATION OF IMAGE DATA 613 | MAIN SCANNING ORIENTATION OF IMAGE DATA 614 | MAXIMUM IMAGE HEIGHT | TOTAL IMAGE WIDTH | MOUNTED IMAGE NUMBER | MARGIN AREA |
| 1511 | SHORT SIDE | SHORT SIDE | SHORT SIDE | SHORT SIDE | 7 | 14 | 4 | 62 |
| ... | | | | | | | | |

FIG.17

| 1501 | 1502 | 1503 | 1504 | 1505 | 1506 | 1507 | 1508 | 1509 |
|---|---|---|---|---|---|---|---|---|
| COMBINATION ID | MAIN SCANNING ORIENTATION OF IMAGE DATA 611 | MAIN SCANNING ORIENTATION OF IMAGE DATA 612 | MAIN SCANNING ORIENTATION OF IMAGE DATA 613 | MAIN SCANNING ORIENTATION OF IMAGE DATA 614 | MAXIMUM IMAGE HEIGHT | TOTAL IMAGE WIDTH | MOUNTED IMAGE NUMBER | MARGIN AREA |
| 1511 | SHORT SIDE | SHORT SIDE | SHORT SIDE | SHORT SIDE | 7 | 14 | 4 | 62 |
| 1512 | LONG SIDE | SHORT SIDE | SHORT SIDE | SHORT SIDE | 7 | 15 | 4 | 62 |
| 1513 | SHORT SIDE | LONG SIDE | SHORT SIDE | SHORT SIDE | 5 | 16 | 4 | 22 |
| 1514 | LONG SIDE | LONG SIDE | SHORT SIDE | SHORT SIDE | 5 | 17 | 4 | 22 |
| ... | | | | | | | | |
| 1517 | SHORT SIDE | LONG SIDE | LONG SIDE | SHORT SIDE | 5 | 18 | 4 | 22 |
| 1518 | LONG SIDE | LONG SIDE | LONG SIDE | SHORT SIDE | 5 | 19 | 4 | 22 |
| ... | | | | | | | | |
| 1521 | SHORT SIDE | LONG SIDE | SHORT SIDE | LONG SIDE | 5 | 18 | 4 | 22 |
| 1522 | LONG SIDE | LONG SIDE | SHORT SIDE | LONG SIDE | 5 | 19 | 4 | 22 |
| ... | | | | | | | | |
| 1525 | SHORT SIDE | LONG SIDE | LONG SIDE | LONG SIDE | 5 | 20 | 4 | 22 |
| 1526 | LONG SIDE | LONG SIDE | LONG SIDE | LONG SIDE | 5 | 21 | 3 | 30 |

FIG.18

| | 1901 | 1902 | 1903 | 1904 | 1900 |
|---|---|---|---|---|---|

| IMAGE DATA ID | SHORT SIDE LENGTH | LONG SIDE LENGTH | MAIN SCANNING ORIENTATION |
|---|---|---|---|
| 611 | 4 | 5 | SHORT SIDE |
| 612 | 5 | 7 | SHORT SIDE |
| 613 | 3 | 5 | SHORT SIDE |
| 1914 | 2 | 21 | LONG SIDE |
| 615 | 4 | 6 | SHORT SIDE |
| 616 | 2 | 5 | SHORT SIDE |

| IMAGE DATA ID | SHORT SIDE LENGTH | LONG SIDE LENGTH | MAIN SCANNING ORIENTATION |
|---|---|---|---|
| 611 | 4 | 5 | SHORT SIDE |
| 612 | 5 | 7 | SHORT SIDE |
| 613 | 3 | 5 | SHORT SIDE |
| 1914 | 2 | 21 | SHORT SIDE |
| 615 | 4 | 6 | SHORT SIDE |
| 616 | 2 | 5 | SHORT SIDE |

IMAGE ARRANGEMENT APPARATUS AND IMAGE FORMING APPARATUS, IMAGE ARRANGEMENT METHOD, AND COMPUTER READABLE STORAGE MEDIUM

BACKGROUND OF THE INVENTION

Field of the Invention

The present disclosure relates to an image arrangement apparatus and an image forming apparatus, an image arrangement method, and a computer readable storage medium.

Description of the Related Art

Recently, among image forming apparatuses including a printer, there has been widespread an image forming apparatus such as a large-format printer that prints an image on a large sheet including a large-format roll paper so as to print a poster and the like. Usually, the large-format printer prints multiple images by lining up the images in a sheet conveyance direction such that the left end of each image is aligned with the left end of a large sheet. In the image forming apparatus such as the large-format printer as mentioned above, if roll paper having an extremely wider width than the width of an image indicated by image data is set, a large margin is generated between the right end of the printed image and the right end of the sheet, and thus the sheet is wasted. To deal with this, there has been used nesting printing in which multiple images are printed on a sheet after being arranged in a main scanning direction of the sheet. In this case, the main scanning direction is a direction in which the sheet is scanned by a reciprocally moving printing head. Usually, the main scanning direction coincides with the width direction of the sheet and intersects a sheet conveyance direction. If the nesting printing is performed while the orientation of the image included in a received printing job is set in accordance with the setting by the printing job, the following problem may occur in some cases. That is, in a case where the sizes of individual images included in the multiple images arranged side by side in the sheet width direction are different from each other or not determined in advance, a large margin may be generated around the images. A technique of automatic rotation of an image in the nesting printing is disclosed on pp. 252-253 in http://gd1p01.c-wss.com/gds/5/0300029125/02/TX-3000_OnlineManual_Mac_JP_V02.pdf under titled of "[Use of Nesting Function] and [Automatic Rotation]" (searched on Jun. 2, 2022, hereinafter, referred to as Literature 1) on the Internet by Canon Inc. According to this technique, arranging images side by side in the sheet width direction for the nesting printing are repeated. Additionally, for example, if there is an image 101 that can not contained in a printing region in the main scanning direction as illustrated in FIG. 1A, the image 101 is rotated by 90 degrees. If the image 101 can be contained in the printing region in the main scanning direction by the rotation as illustrated in FIG. 1B, the image 101 after the rotation is arranged.

According to the function of the automatic rotation described in Literature 1, there is a tendency that the length of the image after the rotation in the sheet conveyance direction is longer than the other images arranged in advance. In this case, an extra margin is generated under the other image arranged in advance. Specifically, a margin 102 in the example in FIG. 1B is generated. To deal with this, Japanese Patent Laid-Open No. 2005-275682 (hereinafter, referred to as Literature 2) discloses a technique to arrange multiple images on a sheet while reducing a margin. According to this technique, multiple images are arranged on a cut sheet having a size determined in advance. Specifically, as illustrated in FIG. 2, multiple images are arranged on the cut sheet by repeating dividing a margin that is left after an image is arranged into multiple rectangular regions and arranging the next image in any one of the rectangular regions. Literature 2 further describes that this arrangement method can be applied to a roll paper after defining a virtual cut sheet on the roll paper. However, there is no description about how to determine the size of the virtual cut sheet. Additionally, in any case, it is impossible to execute the method of arranging the image without determining the size of the virtual cut sheet in advance. Therefore, unless the size of the virtual cut sheet determined in advance coincidentally matches the size of the actually printed images after the fact, a wasted margin is generated around the images.

SUMMARY OF THE INVENTION

An embodiment of the present disclosure is an image arrangement apparatus that arranges a plurality of images for nesting printing, in which images are printed side by side in a main scanning direction that intersects a sheet conveyance direction, including: a first arrangement unit configured to arrange the plurality of images side by side in the main scanning direction such that either one of a long side direction and a short side direction of each image included in the plurality of images coincides with the main scanning direction in accordance with a combination of respective rotations of images included in the plurality of images and also such that the plurality of images are contained in a rectangular region defined based on the combination; a calculation unit configured to calculate an area of a margin that is a part of the rectangular region, wherein the part is where the plurality of images arranged by the first arrangement unit are not present; and a selection unit configured to select one of a plurality of the combinations based on the area of the margin corresponding to each combination.

Further features of the present invention will become apparent from the following description of exemplary embodiments with reference to the attached drawings.

BRIEF DESCRIPTION OF THE DRAWINGS

FIGS. 5A to 5D are tables illustrating examples of an image management table for the image forming apparatus according to a first embodiment of the present disclosure to manage the size and the orientation of each image;

FIG. 8 is a table illustrating an example of a combination management table for the image forming apparatus according to the first embodiment of the present disclosure to manage a combination of the orientations of the images;

FIG. 9 is another table illustrating an example of the combination management table for the image forming apparatus according to the first embodiment of the present disclosure to manage a combination of the orientations of the images;

FIG. 10 is yet another table illustrating an example of the combination management table for the image forming apparatus according to the first embodiment of the present disclosure to manage a combination of the orientations of the images;

FIG. 11 is yet another table illustrating an example of the combination management table for the image forming apparatus according to the first embodiment of the present disclosure to manage a combination of the orientations of the images;

FIG. 12 is yet another table illustrating an example of the combination management table for the image forming apparatus according to the first embodiment of the present disclosure to manage a combination of the orientations of the images;

FIG. 13 is yet another table illustrating an example of the combination management table for the image forming apparatus according to the first embodiment of the present disclosure to manage a combination of the orientations of the images;

FIGS. 14A and 14B are tables illustrating examples of an image management table for an image forming apparatus according to a second embodiment of the present disclosure to manage the size and the orientation of each image;

FIG. 15 is a table illustrating an example of a combination management table for the image forming apparatus according to the second embodiment of the present disclosure to manage a combination of the orientations of the images;

FIG. 16 is another table illustrating an example of a combination management table for the image forming apparatus according to the second embodiment of the present disclosure to manage a combination of the orientations of the images;

FIG. 17 is yet another table illustrating an example of a combination management table for the image forming apparatus according to the second embodiment of the present disclosure to manage a combination of the orientations of the images;

FIG. 18 is yet another table illustrating an example of a combination management table for the image forming apparatus according to the second embodiment of the present disclosure to manage a combination of the orientations of the images;

FIGS. 19A and 19B are tables illustrating examples of an image management table for an image forming apparatus according to a third embodiment of the present disclosure to manage the size and the orientation of an image by.

DESCRIPTION OF THE EMBODIMENTS

Figure 1A:
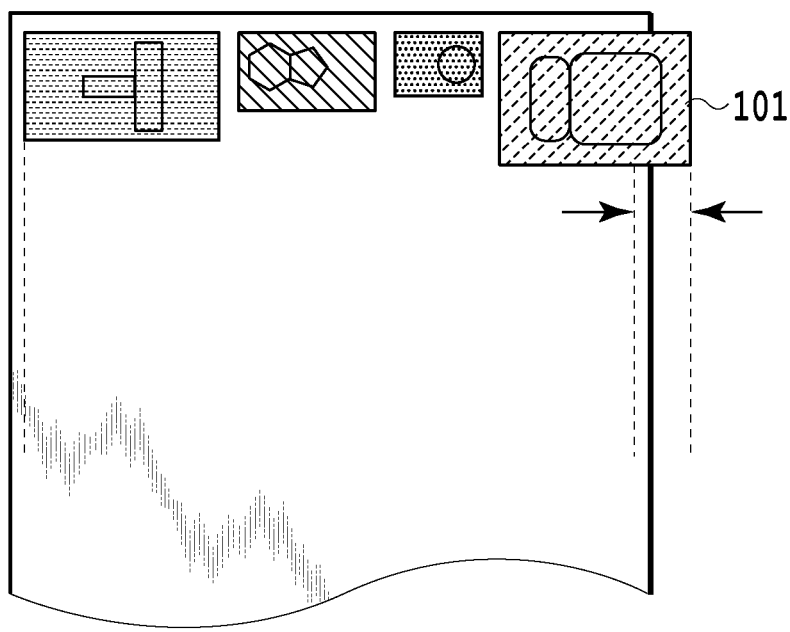
FIGS. 1A and 1B are first diagrams describing a related art.
Figure 1B:
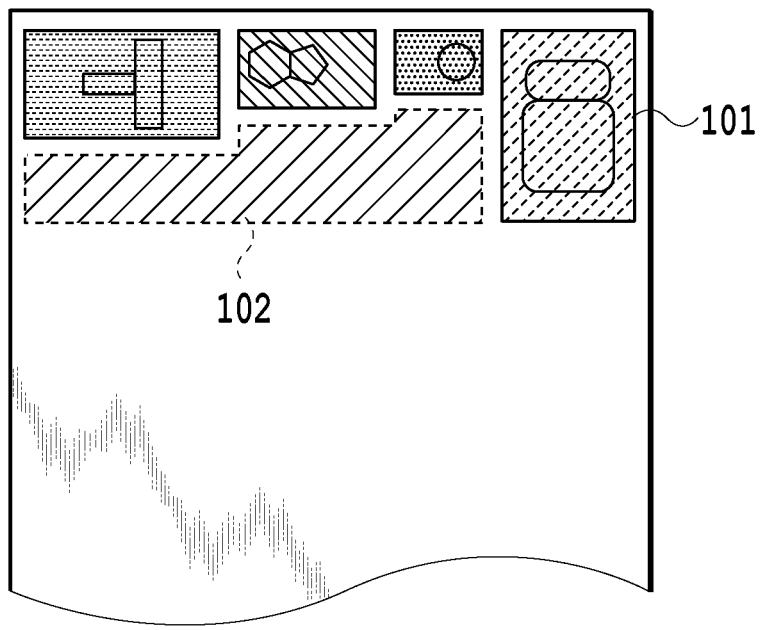
Figure 2:
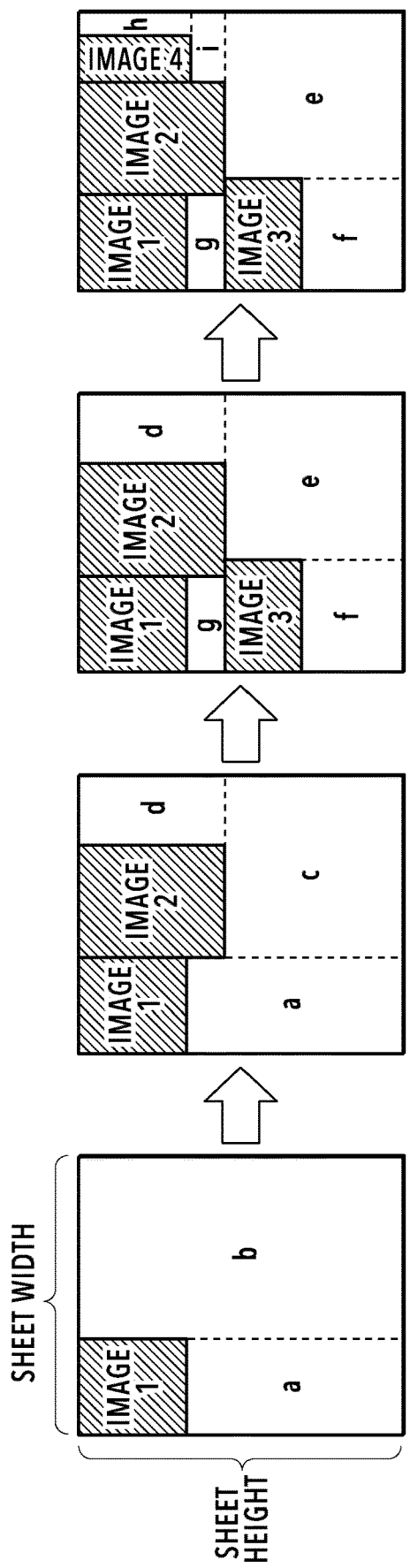
FIG. 2 is a second diagram describing a related art.

Embodiments are described below in detail with reference to the appended drawings. Note that, the embodiments below are not intended to limit the disclosure according to the scope of claims. Although multiple characteristics are described in the embodiments, not all the combinations of the multiple characteristics are necessarily required for the disclosure, and the multiple characteristics may be combined with each other as needed. Additionally, the same or similar configurations in the appended drawings are denoted by the same reference numerals, and duplicated descriptions are omitted.

(Apparatus Configuration)

Figure 3:
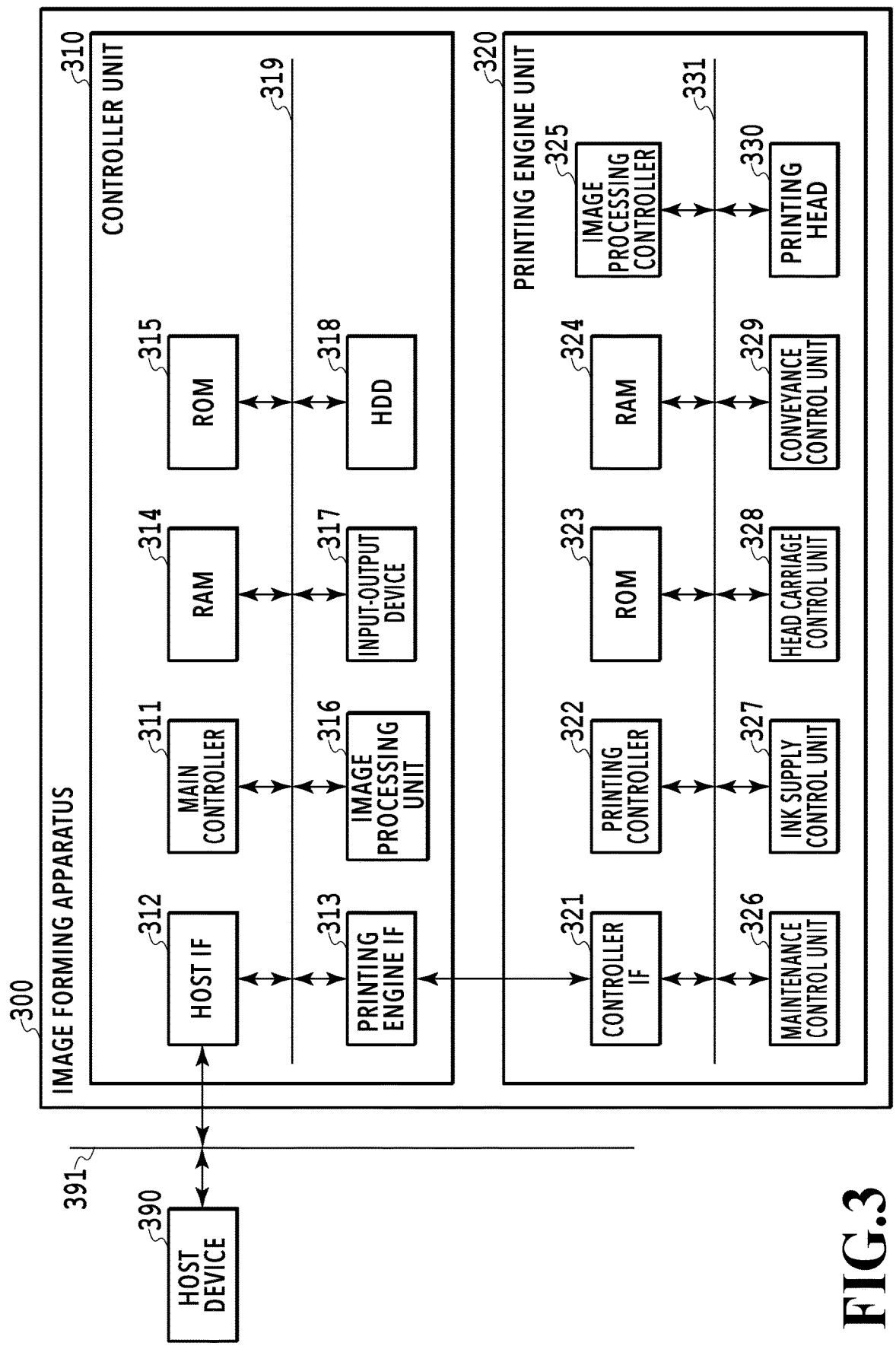
FIG. 3 is a diagram illustrating a schematic internal configuration of an image forming apparatus according to an embodiment of the present disclosure.

FIG. 3 is a diagram illustrating a schematic configuration of an image forming apparatus according to the present embodiment. In FIG. 3, an image forming apparatus 300 includes a controller unit 310 and a printing engine unit 320. Additionally, the image forming apparatus 300 is connectable to a host device 390 through a network 391.

The controller unit 310 includes a main controller 311, a host IF 312, a printing engine IF 313, a RAM 314, a ROM 315, an image processing unit 316, an input-output device 317, and an HDD 318. These components are connected to each other through a system bus 319.

The main controller 311 composed of a CPU performs a printing operation and controls operations of the overall image forming apparatus 300 in accordance with a program and various parameters stored in the ROM 315 while using the RAM 314 as a working area. For example, when image data is inputted from the host device 390 through the host IF 312, the image processing unit 316 performs predetermined image processing on the received image data in accordance with an instruction from the main controller 311. The main controller 311 then transmits the image data subjected to the image processing to the printing engine unit 320 through the printing engine IF 313. The RAM 314 is used as the working area of the main controller 311, used as a temporal storage region of a variety of received data, and stores various setting data.

The ROM 315 stores a program to be executed by the main controller 311 and various data required for various operations by the image forming apparatus 300.

The image processing unit 316 performs various types of image processing. For example, the image processing unit 316 performs processing to develop (convert) image data expressed by a page description language into bitmap image data. For example, the image processing unit 316 performs processing to convert a color space of the inputted image data (for example, YCbCr) into a normal RGB color space (for example, sRGB). For example, a variety of types of image processing including resolution conversion into the effective number of pixels (i.e., the number of pixels to which printing processing by the image forming apparatus 300 can be applied), image analysis, image correction, generation of a single piece of synthesis image data by synthesizing a plurality pieces of image data, and so on are performed as needed. The image data obtained by the above-mentioned image processing is stored in the RAM 314.

The input-output device 317 includes a hardware key and a panel for a variety of manipulations by a user and a display unit that displays (notifies) a variety of pieces of information to the user. Additionally, the input-output device 317 may display the information to the user by outputting sound (buzzer, sound, and so on) based on audio information from a sound generator.

The HDD 318 is a non-volatile storage region and is capable of storing a program to be executed by the main controller 311, image data, and setting information required for various operations by the image forming apparatus 300. Note that, another high-capacity storage device such as a flash memory may be used instead of the HDD 318.

The printing engine unit 320 is a printing unit that performs image formation. The printing engine unit 320 includes a controller IF 321, a printing controller 322, a ROM 323, a RAM 324, and an image processing controller 325. Additionally, the printing engine unit 320 includes a maintenance control unit 326, an ink supply control unit 327, a head carriage control unit 328, a conveyance control unit 329, and a printing head 330. These components are connected to each other through a system bus 331.

The printing controller 322 composed of a CPU controls various mechanisms included in the printing engine unit 320 in accordance with a program and various parameters stored in the ROM 323 while using the RAM 324 as a working area.

When various commands and the image data are received through the controller IF 321, the printing controller 322 temporarily saves the commands and the image data into the RAM 324.

The printing controller 322 causes the image processing controller 325 to convert the saved image data into printing data such that the printing head 330 can use the printing data for the printing operation.

After the printing data is generated, the printing controller 322 causes the printing head 330 to execute the printing operation based on the printing data.

In this process, the printing controller 322 requests the conveyance control unit 329 to convey the sheet in the sheet conveyance direction. In this case, the sheet conveyance direction is also referred to as a sub scanning direction. In a case where the sheet as a printing medium is a roll paper, usually, the sheet conveyance direction and the length direction (i.e., the wind-up direction) of the sheet coincide with each other.

In accordance with the instruction from the printing controller 322, the printing operation by the printing head 330 is executed in conjunction with the sheet conveyance operation, and thus the printing processing is performed.

The head carriage control unit 328 changes the movement direction and the position of the printing head 330 depending on an operational state of the image forming apparatus 300 such as a maintenance state and a printing state. In a case where the image forming apparatus 300 is in the printing state, the head carriage control unit 328 reciprocally moves the printing head 330 in a direction intersecting the sheet conveyance direction. In this case, the direction in which the printing head 330 is reciprocally moved is referred to as the main scanning direction. If the sheet as the printing medium is a roll paper, usually, the main scanning direction and the width direction (direction orthogonal to the wind-up direction) of the sheet coincide with each other.

The ink supply control unit 327 controls the pressure of ink supplied to the printing head 330 to fall within an appropriate range.

The maintenance control unit 326 controls cleaning of a conveyance roller, which is controlled by the conveyance control unit 329, and the printing head 330.

The printing head 330 is a printing component that performs printing of an image and prints an image on the sheet as the printing medium based on the image data. For example, a plurality of the printing head 330 are provided corresponding to multiple colors and form an image on the sheet by ejecting respective inks in synchronization with the conveyance of the sheet. Note that, an ink jet type printer using ink as printing material is exemplified as the image forming apparatus 300 according to the present embodiment; however, the image forming apparatus 300 is not limited thereto. The present disclosure is applicable to other types of printing apparatus using a variety of printing methods, such as a thermal printer (sublimation type, thermal-transfer type, and the like), a dot impact printer, an LED printer, and an electrophotographic type printer such as a laser printer.

Note that, in the present embodiment, the input-output device 317 is provided inside the image forming apparatus 300; however, the input-output device 317 is not limited thereto, and the input-output device 317 may be an external component connected to the image forming apparatus 300 through the network 391, for example. Additionally, the host device 390 may also function as the input-output device 317. Moreover, another configuration may be adopted in which, in addition to the input-output device 317, another input-output device is connectable to the image forming apparatus 300 through the network 391 or the like.

Additionally, in the present embodiment, the image data is temporally saved in the RAMs 314 and 324; however, the image data may be temporally saved in a non-volatile device such as an HDD.

Moreover, for example, the host device 390 is an external device as a supply source of the image data, and a printer driver is installed therein. Instead of or in addition to the host device 390, for example, a data provision device as a supply source of the image data such as a digital camera and a smartphone may be provided for the image forming apparatus 300. The connection configuration between each device and the image forming apparatus 300 is not limited to the configuration through the network 391, and each device and the image forming apparatus 300 may be directly connected to each other through wireless communication, for example.

In the present embodiment, the program stored in the ROM 315 or the HDD 318 includes an image arrangement program for particularly implementing the function of the present embodiment. The image arrangement program may be supplied to a system or a device through a network or through various storage mediums. Additionally, in the system or the device, in accordance with the program that the computer (a CPU, an MPU, and the like) reads, the computer itself may execute the function, or the computer may cause various mechanisms to execute the function. Moreover, this program may be executed by a single computer or may be executed by multiple computers that cooperates with each other. Furthermore, it is not always necessary to implement all the above-described processes by software, and a part of or all of the processes may be implemented by hardware such as an ASIC. Additionally, it is not limited to a mode in which all the parts of processing are performed by a single CPU. A mode in which all the parts or partial parts of processing are performed by multiple CPUs that cooperates with each other, or a mode in which one part of processing is executed by a single CPU while the other parts of processing are executed by multiple CPUs that cooperates with each other may be applicable.

First Embodiment

An example of a flow of processing executed by the image forming apparatus 300 according to the present embodiment is described. In the present embodiment, an example will be described in which subsequent image data is continuously received within a standby time, and the number of the standby images becomes more than one line of images to be printed, so that the images are arranged and then the printing is started.

Figure 4:
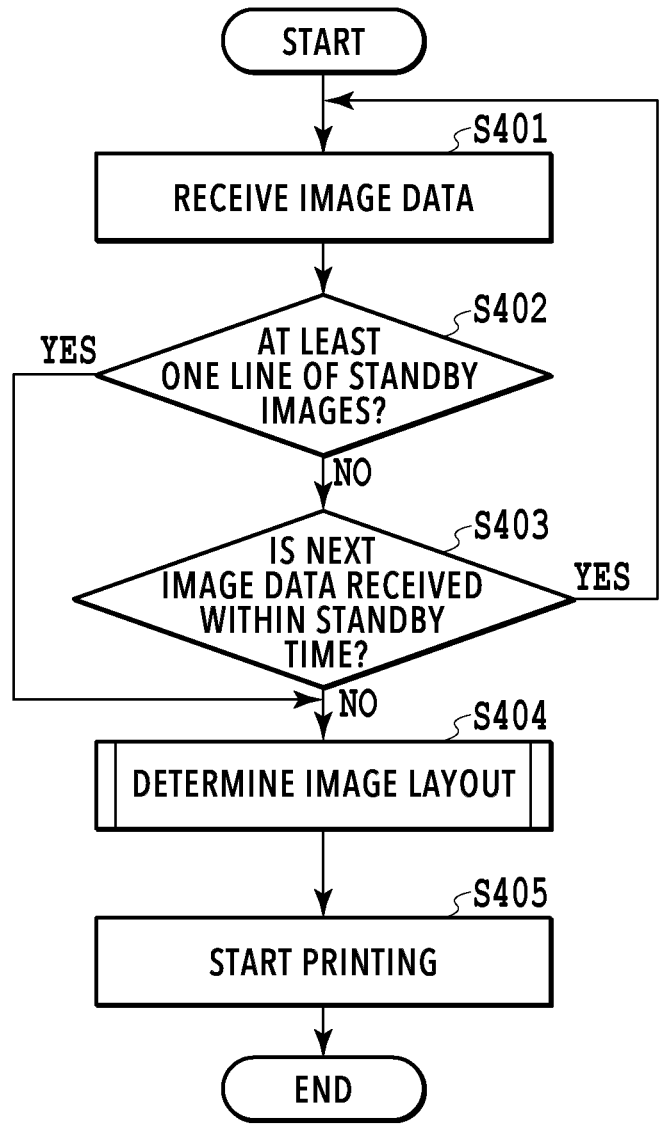
FIG. 4 is a flowchart illustrating an example of a method that starts with image data reception and ends with start of printing and that is performed by the image forming apparatus according to the embodiment of the present disclosure.

FIG. 4 is a flowchart illustrating an example of a method that starts with image data reception and ends with start of printing and that is performed by the image forming apparatus 300.

FIGS. 5A to 5D are tables illustrating examples of an image management table for managing the size and the orientation of the image. An image management table 500 holds information including an image data ID 501, an image short side length 502, an image long side length 503, and an image main scanning orientation 504. In this case, in the image management table 500, the main scanning orientation has a value of the long side or the short side. The long side of an image whose main scanning orientation is the long side coincides with the main scanning direction when the image is not rotated. On the other hand, the short side of an image whose main scanning orientation is the short side coincides with the main scanning direction when the image is not rotated. The rotation is described later.

Figure 6B:
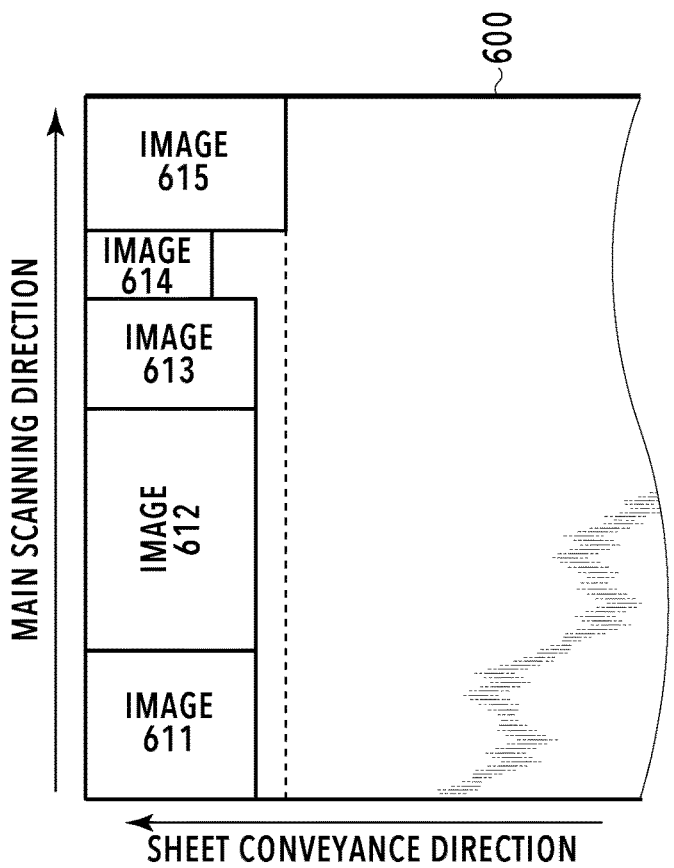
FIG. 6B is a schematic diagram illustrating multiple images that are arranged after respective rotations of images are adjusted by the image processing device according to the first embodiment of the present disclosure.
Figure 6A:
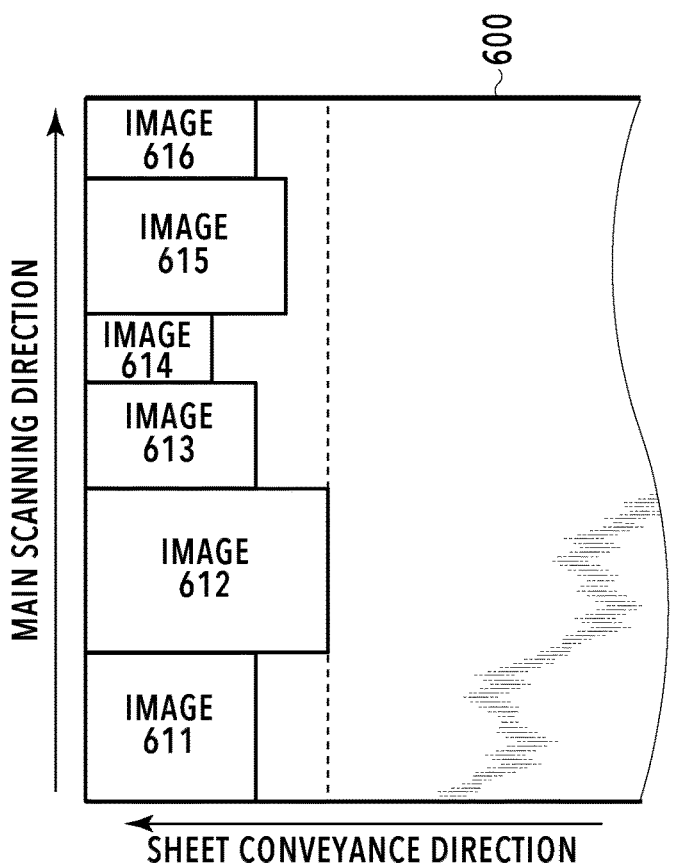
FIG. 6A is a schematic diagram illustrating multiple images that are arranged before respective rotations of images are adjusted by an image processing device according to the first embodiment of the present disclosure.

FIGS. 6A and 6B are schematic diagrams illustrating the images arranged on the sheet in the image forming apparatus 300. The image forming apparatus 300 receives image data corresponding to an image 611, image data corresponding to an image 612, and image data corresponding to an image 613 in this described order. Subsequently, the image forming apparatus 300 receives image data corresponding to an image 614, image data corresponding to an image 615, and image data corresponding to an image 616 in this described order. The image forming apparatus 300 then arranges the images 611 to 616 on a sheet 600. The orientation of each image follows the main scanning orientation 504. For example, in the image management table 500 in the state illustrated in FIG. 5C, the main scanning orientations of all the images are the short side, to which the arrangement illustrated in FIG. 6A follows.

Figure 7:
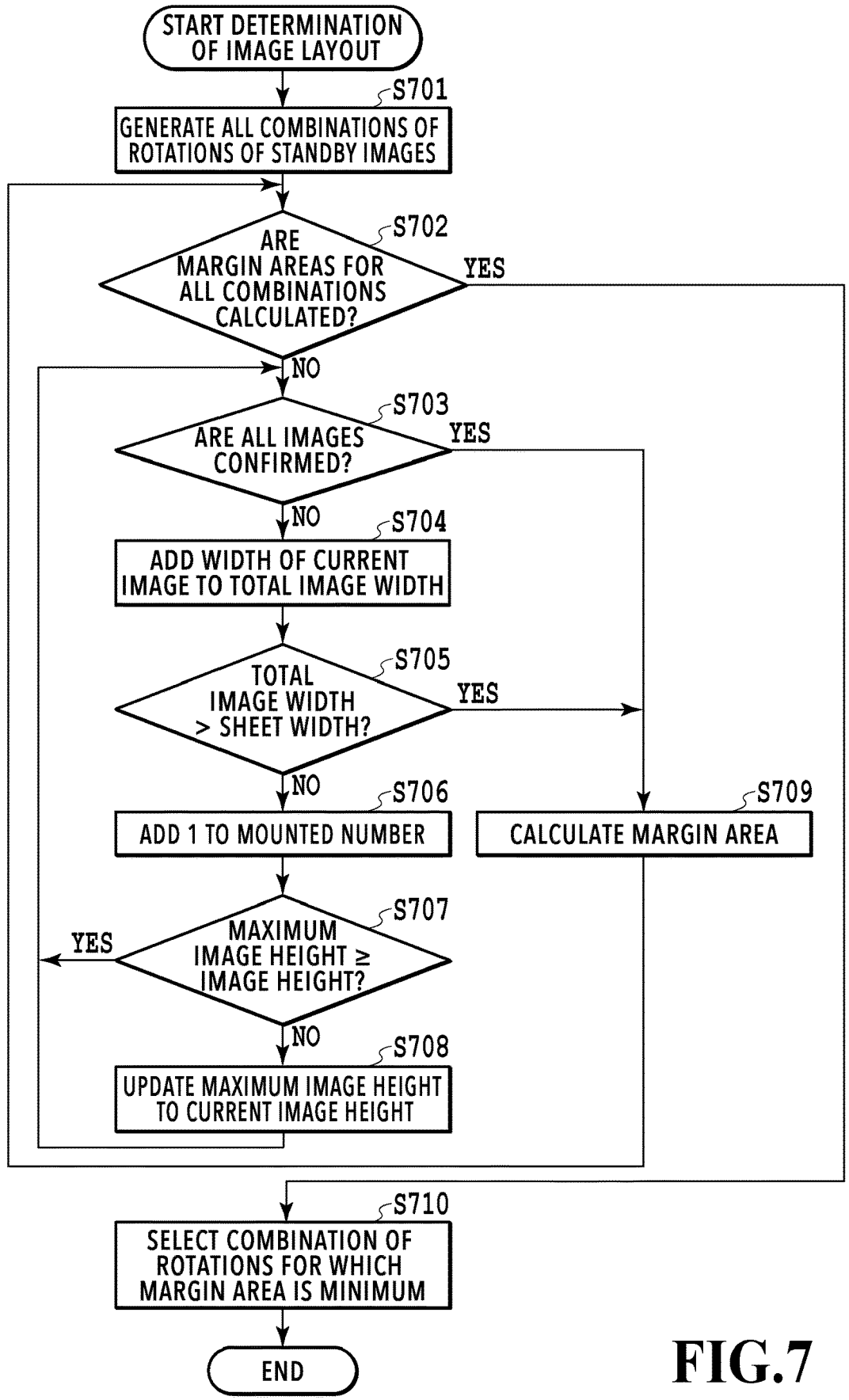
FIG. 7 is a flowchart illustrating an example of an image arrangement method executed by the image processing device according to the first embodiment of the present disclosure.

FIG. 7 is a flowchart illustrating an example of details of the image arrangement in step S404 in FIG. 4. Note that, "step S" is hereinafter abbreviated as "S".

FIGS. 8 to 13 are tables illustrating examples of transition of a combination management table for managing a combination of the orientations of the images. A combination management table 800 holds information including a combination ID 801, main scanning orientations 802, 803, 804, 805, 806, and 807, a maximum image height 808, a total image width 809, the number of mounted images 810, and a margin area 880. The main scanning orientations 802, 803, 804, 805, 806, and 807 correspond to the main scanning orientations of the images 611, 612, 613, 614, 615, and 616, respectively.

The present embodiment is described below with reference to the schematic configuration diagram in FIG. 3, the flowchart in FIG. 4, the tables in FIGS. 5A to 5D, the schematic diagrams in FIGS. 6A and 6B, the flowchart in FIG. 7, and the tables in FIGS. 8 to 13.

In S401, the host IF 312 stores the image data corresponding to the received image 611 into the RAM 314 and notifies the main controller 311 of the storage.

In S402, the main controller 311 confirms whether at least one line of image data for printing are accumulated in the RAM 314. In this case, if a total length of the short sides 502 of images is equal to or greater than the width of the printing region of the sheet, it is determined that at least one line of image data for printing are accumulated. If at least one line of image data for printing are accumulated (S402: Y), the main controller 311 allows the processing to proceed to S404, while if not (S402: N), the main controller 311 allows the processing to proceed to S403. For example, in a case where the width of the printing region is set to 20, since the total length of the short side is 4 in the state of FIG. 5A in which the image data corresponding to the image 611 is received, the main controller 311 determines that at least one line of image data for printing are not stored yet and allows the processing to proceed to S403.

In S403, the main controller 311 waits for the next image data to be received for a predetermined standby time. The waiting time is stored as a parameter in the ROM 315, for example. If the next image data is received within the predetermined standby time (S403: Y), the main controller 311 returns the processing to S401, while if not (S403: N), the main controller 311 allows the processing to proceed to S404. This time, the image data corresponding to the next image 612 is received within the predetermined standby time (S403: Y); therefore, the main controller 311 returns the processing to S401. As a result, the image management table 500 transitions to the state of FIG. 5B. Thereafter, since the total length of the short sides is 9, the main controller 311 determines to be NO in S402 and allows the processing to proceed to S403.

Likewise, the image data corresponding to the image 613, the image data corresponding to the image 614, and the image data corresponding to the image 615 are received within respective predetermined standby times, and the main controller 311 repeats S401, S402, and S403. After the image data corresponding to the image 615 is received, the total value of the widths of the image 611 to the image 615 becomes 18.

Thereafter, the image data corresponding to the image 616 is received in S401, and the image management table 500 transitions to the state of FIG. 5C. Thereafter, since the total length of the short sides is 20, the main controller 311 determines to be YES in S402 and allows the processing to proceed to S404.

In S404, the main controller 311 determines arrangement of each image based on the image management table 500.

In S405, the main controller 311 generates the synthesis image data by the controller unit 310 and thereafter requests the printing engine unit 315 to perform printing based on the synthesis image data. Specifically, in accordance with the instruction from the main controller 311, the image processing unit 316 synthesizes the image data corresponding to the image 611 to the image data corresponding to the image 615 to generate the single synthesis image data and stores the synthesis image data into the RAM 314. Through the printing engine IF 313 and the controller IF 321, the main controller 311 requests the printing controller 322 to perform printing based on the synthesis image data. The printing controller 322 saves the received synthesis image data into the RAM 324. The printing controller 322 causes the image processing controller 325 to convert the synthesis image data into such printing data that the printing head 330 can use for the printing operation. After the printing data is generated, the printing controller 322 causes the conveyance control unit 329 to execute the conveyance of the sheet and causes the printing head 330 to execute the printing operation based on the printing data in conjunction with the conveyance.

After the execution of S405 is completed, the main controller 311 ends processing.

FIG. 7 is a flowchart illustrating an example of details of the image arrangement in S404 illustrated in FIG. 4.

When starting the image arrangement processing, in S701, the main controller 311 first generates all the combinations of the rotations of the standby images. In this case, 64 combinations in which either one of the long side direction and the short side direction of each image included in the six images, which are the images 611, 612, 613, 614, 615, and 616, coincides with the main scanning direction are generated. Combination 811 to combination 874 illustrated in FIG. 8 are the 64 combinations. For example, in the combination 811, the main scanning orientations of all the images are the short side. Additionally, in the combination 812, the main scanning orientation of the image 611 is the long side while the main scanning orientations of all the other images are the short side. In the combination 834, the main scanning orientations of the images 612 and 616 are the long side while the main scanning orientations of all the other images are the short side. In the combination 874, the main scanning orientations of all the images are the long side. Descriptions of the other combinations are omitted.

In S702, the main controller 311 confirms whether calculation of the margin areas 880 for all the combinations has been done. If the calculation has been done (S702: Y), the main controller 311 allows the processing to proceed to S710, while if the calculation has not been done yet (S702: N), the main controller 311 allows the processing to proceed to S703. In the combination management table 800 illustrated in FIG. 8, the maximum image heights, the total image widths, and the number of mounted images of all the combinations 811 to 874 are zero, and the margin areas are not calculated (N/A). That is, in the state of FIG. 8, there is no combination for which the calculation of the margin area 880 has been done. Accordingly, the main controller 311 returns the processing to S703.

In S703, the main controller 311 confirms whether confirmation of all the images has been done. That is, the main controller 311 confirms whether S704 to S708 have been executed for all the images. If the confirmation has been done (S703: Y), the main controller 311 allows the processing to proceed to S709, while if the confirmation has not been done (S703: N), the main controller 311 allows the processing to proceed to S704. In this process, the confirmation is performed in the order of receiving the image 611, the image 612, . . . , and the image 616, for example; however, the order of the images to be confirmed may be arbitrary. At the time of confirming the image 611, not all the images have been confirmed yet (S703: N); accordingly, the main controller 311 allows the processing to proceed to S704.

In S704, the main controller 311 adds the length of the current image along the main scanning direction to the current value of the total image width 809 along the main scanning direction and allows the processing to proceed to S705. In this process, the length of the current image along the main scanning direction is the length of the short side if the image main scanning orientation is the short side and is the length of the long side if the main scanning orientation is the long side. In the combination 811, the main scanning orientation of the image 611 is the short side; accordingly, the main controller 311 adds the length of the short side of the image 611, which is 4, to the current value of the total image width 809, which is zero, and allows the processing to proceed to S705.

In S705, the main controller 311 determines whether the current value of the total image width 809 is greater than the length of the printing region along the main scanning direction. If the current value of the total image width 809 is greater than the length of the printing region along the main scanning direction (S705: Y), the main controller 311 allows the processing to proceed to S709, while if the current value of the total image width 809 is equal to or smaller than the length of the printing region along the main scanning direction (S705: N), the main controller 311 allows the processing to proceed to S706. Accordingly, the number of the images that have been confirmed so far when YES is determined in S705 is the maximum number of the images that can be arranged side by side to be contained in the length along the main scanning direction of the printing region while either one of the short side direction and the long side direction of each image coincides with the main scanning direction according to the combination. In this case, since the current value of the total image width 809, which is 4, is shorter than the sheet width, which is 20, the main controller 311 determines to be NO in S705 and allows the processing to proceed to S706.

In S706, the main controller 311 adds 1 to the number of mounted images 810 and allows the processing to proceed to S707. In this process, the main controller 311 adds 1 to the number of mounted images 810 whose the current value is zero, and thus the number of mounted images 810 becomes 1.

In S707, the main controller 311 confirms whether the current value of the maximum image height 808 is greater than or equal to the image height of the current image. If the current value of the maximum image height 808 is greater than or equal to the image height of the current image (S707: Y), the main controller 311 bypasses S708 and returns the processing to S703, while if the current value of the maximum image height 808 is smaller than the image height of the current image (S707: N), the main controller 311 allows the processing to proceed to S708. In this process, the image height is a length of the image along the sheet conveyance direction. If the image main scanning orientation is the long side, the image height is the length of the short side, and on the other hand, if the image main scanning orientation is the short side, the image height is the length of the long side. Since the main scanning orientation of the image 611 in the combination 811 is the short side, the height of the image 611 is the long side length 503 of the image 611, and the value is 5. The main controller 311 determines that the current value of the maximum image height 808, which is zero, is smaller than the height of the image 611, which is 5 (S707: N), and allows the processing to proceed to S708.

In S708, the main controller 311 updates the maximum image height 808 to the image height of the current image and returns the processing to S703. In this case, since the main scanning orientation of the image 611 in the combination 811 is the short side, the main controller 311 updates the maximum image height 808 to 5, which is the long side length 503 of the image 611. Therefore, the combination management table 800 transitions to the state illustrated in FIG. 9.

In the state of FIG. 9, the maximum image height 808 is 5, the total image width 809 is 4, and the number of mounted images 810 is 1, corresponding to the combination 811. The margin area is not calculated yet.

Likewise, after S703 to S708 have been repeatedly executed for the images 612, 613, 614, 615, and 616 corresponding to the combination ID 811, the combination management table 800 transitions to the state illustrated in FIG. 10.

In the state of FIG. 10, the maximum image height 808 is 7, the total image width 809 is 20, and the number of mounted images 810 is 6, corresponding to the combination 811. The margin area is not calculated yet.

After executing S704 to S708 on the image 616, the main controller 311 determines to be YES in S703 and allows the processing to proceed to S709.

In S709, the main controller 311 calculates the margin area, records the calculated margin area into the margin area 880 corresponding to the combination 811 in the combination management table 800, and thereafter returns the processing to S702. In this process, it is possible to obtain the margin area by subtracting the total of the areas of all the mountable images (that is, all the images that can be contained in a rectangular region) from the area of the rectangular region in which the height is the maximum image height 808 and the width is the width of the printing region. The maximum image height is a length along the sheet conveyance direction of an image having the maximum length along the sheet conveyance direction out of all the mountable images. Accordingly, in the sheet conveyance direction, the rectangular region is a region between two straight lines including two sides of both ends in the sheet conveyance direction of the image having the longest length along the sheet conveyance direction out of the multiple images arranged according to the combination. That is, in the sheet conveyance direction, a length of the rectangular area is defined by the longest length out of respective lengths of images included in the plurality of images, wherein each of the lengths is a length of either one of a long side and a short side of each image included in the plurality of images, and wherein a direction of the either one coincides with the sheet conveyance direction according to the combination. Additionally, in the main scanning direction, the rectangular region is a region between two straight lines sandwiching the printing region. In this case, the height of the image having the longest length along the sheet conveyance direction is the maximum image height 808. Additionally, the maximum image height 808 is determined based on the combination of respective rotations of the images and the long side length and the short side length of each image. Moreover, the printing region is determined in advance. Accordingly, it can be said that, in the sheet conveyance direction, the length of the rectangular region is defined based on the combination of respective rotations of the images and the long side lengths and the short side lengths of the multiple images. Additionally, since the width of the printing region is the width of the rectangular region, it can be said that, in the main scanning direction, the length of the rectangular region is defined based on the printing region. The mountable images are selected from the multiple images prepared to be arranged. Moreover, the number of the mountable images is determined based on the combination of the multiple images prepared to be arranged and respective rotations of the images. Accordingly, it can be said that the number of the mountable images depends on the combination of respective rotations of the images.

In the combination 811, the maximum image height 808 is 7, the width of the printing region is 20, and the number of mounted images 810 is 6; therefore, the margin area 880 is:

$$7\times20-(4\times5+5\times7+3\times5+2\times4+4\times6+2\times5)=28.$$

In this case, the six images to be mounted are the images 611, 612, 613, 614, 615, and 616.

In S709, after calculating the margin area corresponding to the combination 811, the main controller 311 allows the processing to proceed to S702. The main controller 311 determines that the calculation of the margin areas corresponding to all the combinations is not completed yet (S702: N) and allows the processing to proceed to S703.

Likewise, corresponding to the combination 812, represented by the row whose ID is 812 in FIGS. 8, 11, 12 and 13, the main controller 311 obtains the total image width and the maximum image height of a case where the images 611, 612, 613, 614, and 615 are sequentially arranged side by side in the main scanning direction. As a result, the combination management table 800 transitions to the state as illustrated in FIG. 11. With reference to FIG. 11, in the row of the combination 812, the maximum image height 808 is 7, the total image width 809 is 19, and the number of mounted images 810 is 5. The margin area 880 is not calculated yet.

The main controller 311 executes S704 on the image 616 corresponding to the combination 812 and obtains the total image width of a case where the image 616 is additionally arranged. As a result, the combination management table 800 transitions to the state as illustrated in FIG. 12. With reference to FIG. 12, in the row of the combination 812, the maximum image height 808 is 7, the total image width 809 is 21, and the number of mounted images 810 is 5. The margin area 880 is not calculated yet.

Next, since the total image width 809 is 21 and exceeds the length of the printing region along the main scanning direction, which is 20, the main controller 311 determines to be YES in S705 and allows the processing to proceed to S709. Accordingly, the number of mounted images, which is 5, is maintained.

In S709, the main controller 311 calculates the margin area corresponding to the combination 812. In the combination 812, the maximum image height 808 is 7, the width of the printing region is 20, and the number of mounted images 810 is 5; therefore, the margin area 880 is:

$$7\times20-(4\times5+5\times7+3\times5+2\times4+4\times6)=38.$$

In this process, the five mounted images are the images 611, 612, 613, 614, and 615.

Likewise, corresponding to the combination 813, represented by the row whose ID is 813 in FIGS. 8 and 13, the total image width and the maximum image height of a case where the images 611, 612, 613, 614, and 615 are sequentially arranged side by side in the main scanning direction are obtained. As a result, the combination management table 800 transitions to the state as illustrated in FIG. 13. With reference to FIG. 13, in the row of the combination 813, the maximum height 808 is 6, the total image width 809 is 22, and the number of mounted images 810 is 5. The margin area is not calculated yet.

Next, since the total image width 809 is 22 and exceeds the length of the printing region along the main scanning direction, which is 20, the main controller 311 determines to be YES in S705 and allows the processing to proceed to S709. Accordingly, the number of mounted images, which is 5, is maintained.

In S709, the main controller 311 calculates the margin area corresponding to the combination 813. In the combination 813, the maximum image height 808 is 6, the width of the printing region is 20, and the number of mounted images 810 is 5; therefore, the margin area 880 is:

$$6\times20-(4\times5+5\times7+3\times5+2\times4+4\times6)=18.$$

In this process, the five mounted images are the images 611, 612, 613, 614, and 615.

Likewise, the main controller 311 executes the processing of calculating the margin areas corresponding to the combination 814 to the combination 874. In S709, the main controller 311 calculates the margin area 880 corresponding to the combination 874, represented by the row s whose IDs are 814 to 874 in FIG. 8, and thereafter allows the processing to proceed to S702. Since the calculation of the margin areas corresponding to all the combinations is completed, the main controller 311 determines to be YES in S702 and allows the processing to proceed to S710.

In S710, the main controller 311 selects a combination of the rotations for which the corresponding margin area is the minimum. Description of the calculation is omitted; the main controller 311 selects the combination 813 and the combination 845 indicating the minimum value of the corresponding margin area, which is 18, out of the 64 combinations (the combination 811 to the combination 874). If there are multiple combinations for which the margin area is the minimum, a combination that satisfies a predetermined condition may be selected out of the combinations. For example, the predetermined condition may be selected from a predetermined condition related to the number of mounted images, a predetermined condition related to the area of the rectangular region, a predetermined condition related to the number of rotated images, and a predetermined condition related to the combination ID. In this case, since the area of the rectangular region is obtained by multiplying the maximum image height by the width of the printing region, it is possible to replace the predetermined condition related to the area of the rectangular region with a condition related to the maximum image height. As the predetermined condition related to the number of mounted images, for example, a condition that the number of mounted images is the maximum may be employed or a condition that the number of mounted images is the minimum may be employed. As the predetermined condition related to the area of the rectangular region, for example, a condition that the area of the rectangular region is the minimum may be employed or a condition that the area of the rectangular region is the maximum may be employed. As the predetermined condition related to the number of the rotated images, for example, a condition that the number of the rotated images is the minimum may be employed or a condition that the number of the rotated images is the maximum may be employed. As the predetermined condition related to the combination ID, for example, a condition that a number of the combination ID is the minimum may be employed or a condition that a number of the combination ID is the maximum may be employed.

If there are multiple combinations that satisfy the predetermined condition, a combination that satisfies yet another predetermined condition may be additionally selected. In this case, it is possible to prioritize the predetermined conditions to be applied.

In this case, the main controller 311 selects the combination 813 in which the combination ID is the minimum out of the combination 813 and the combination 845. Additionally, the main controller 311 updates the image main scanning orientation 504 of the image management table 500 according to the combination 813 and transitions to the state of FIG. 5D. Additionally, the main controller 311 arranges the images 611 to 615 as illustrated in FIG. 6B so as to correspond to the image management table 500 in the state of FIG. 5D and ends the processing of S404.

In S405, in the controller unit 310, the main controller 311 generates the synthesis image data corresponding to the image management table 500 in the state of FIG. 5D. The main controller 311 then requests the printing engine unit 320 to perform printing based on the synthesis image data.

As described above, by allowing the comparison between the margin regions in accordance with the arrangements and the orientations of the images, it is possible to prevent waste of the sheet even if there is a large difference in the length of the long side and the short side of the sheet as the printing medium.

Second Embodiment

In the present embodiment, an example will be described in which image data is not received within a standby period from reception time of previous image data, and standby images are arranged in a state where the number of the standby images is less than one line of images to be printed, and then the printing is started. Hereinafter, differences from the first embodiment will be mainly described, and descriptions of similar parts are omitted. Additionally, parts corresponding to those in the first embodiment are described by denoting the same references.

FIGS. 14A and 14B are tables illustrating examples of the image management table for managing the size and the orientation of the image. An image management table 1400 holds information including an image data ID 1401, an image short side length 1402, an image long side length 1403, and an image main scanning orientation 1404.

FIGS. 15 to 18 are tables illustrating examples of the combination management table for managing a combination of the orientations of the images. A combination management table 1500 holds information including a combination ID 1501, main scanning orientations 1502, 1503, 1504, and 1505, a maximum image height 1506, a total image width 1507, the number of mounted images 1508, and a margin area 1509. The main scanning orientations 1502, 1503, 1504, and 1505 correspond to the main scanning orientations of the images 611, 612, 613, and 614, respectively.

The present embodiment is described below with reference to the schematic configuration diagram in FIG. 3, the flowchart in FIG. 4, the flowchart in FIG. 7, the tables in FIG. 14, and the tables in FIGS. 15 to 18.

In the present embodiment, with the main controller 311 executing S401 to S403 likewise the first embodiment, the controller unit 310 receives the image data corresponding to the image 611 to the image data corresponding to the image 614 within respective predetermined standby times. After receiving the image data corresponding to the image 614, since the total length of the short sides of the four images is 14 and is shorter than the width of the printing region, which is 20, the main controller 311 determines to be NO in S402 and allows the processing to proceed to S403.

In S403, the main controller 311 waits for the next image data to be received for a predetermined standby time. The standby time is stored as a parameter in the ROM 315. If the next image data is received within the predetermined standby time, the main controller 311 returns the processing to S401, while if not, the main controller 311 allows the processing to proceed to S404. This time, the next image data is not received within the predetermined standby time; therefore, the main controller 311 allows the processing to proceed to S404. In this case, the image management table 1400 transitions to the state of FIG. 14A.

After executing S404, the main controller 311 causes the printing engine unit 320 to start printing the images 611, 612, 613, and 614 in S405 and ends the processing.

FIG. 7 is a flowchart illustrating an example of details of the image arrangement in S404 in FIG. 4.

When starting the image arrangement processing, in S701, the main controller 311 first generates all the combinations of the rotations of the standby images. In this case, 16 combinations in which either one of the long side direction and the short side direction of each image included in the four images, which are the images 611, 612, 613, and 614, coincides with the main scanning direction are generated. Combination 1511 to combination 1526 illustrated in FIG. 15 are the 16 combinations. For example, in the combination 1511, the main scanning orientations of all the images are the short side. Additionally, in the combination 1512, the main scanning orientation of the image 611 is the long side while the main scanning orientations of all the other images are the short side. In the combination 1513, the main scanning orientation of the image 612 is the long side, and the main scanning orientations of all the other images are the short side. In the combination 1526, the main scanning orientations of all the images are the long side.

After S704 to S708 have been executed for the first image 611 in the combination 1511, the combination management table 800 transitions to the state as illustrated in FIG. 16. With reference to FIG. 16, the maximum image height is 5, the total image width is 4, and the number of mounted images is 1. The margin area is not calculated yet.

Subsequently, S703 to S708 are repeatedly executed for the rest of the images in the combination 1511, which are the images 612, 613, and 614, and additionally S709 is executed; thus, the combination management table 800 transitions to the state as illustrated in FIG. 17. With reference to FIG. 17, the maximum image height is 7, the total image width is 14, the number of mounted images is 4, and the margin area is 62. In this case, the maximum image height, which is 7, is the maximum value out of the long sides, which are 5, 7, 5, 4, in a direction that coincides with the sheet conveyance direction of a case where the main scanning orientations of all the images are the short side according to the combination 1511. The total image width, which is 14, is a total length of the short sides, which are 4, 5, 3, 2, in a direction that coincides with the main scanning direction of a case where the main scanning orientations of all the images are the short side according to the combination 1511. The margin area, which is 62, is calculated by the following expression:

$$7 \times 20 - (4 \times 5 + 5 \times 7 + 3 \times 5 + 2 \times 4) = 62.$$

Subsequently, after S703 to S709 have been repeatedly executed for the combinations 1512, 1513, . . . , and 1526, the combination management table 800 transitions to the state as illustrated in FIG. 18. With reference to FIG. 18, it can be seen that the margin area takes the minimum value, which is 22, for the combinations 1513, 1514, 1517, 1518, 1521, 1522, and 1525.

Next, the main controller 311 allows the processing to proceed to S710 and selects a combination of the rotations for which the margin area is the minimum. The combinations 1513, 1514, 1517, 1518, 1521, 1522, and 1525 are candidates and, for example, the combination 1513 is selected if such a rule is employed that a combination for which the combination ID is the minimum is selected. The image management table 1400 rewritten to reflect the result from the above selection is as illustrated in FIG. 14B. With control by the main controller 311, the controller unit 310 synthesizes the image data corresponding to the image 611 to the image data corresponding to the image 614 in accordance with the image management table 1400 having the contents illustrated in FIG. 14B and generates the synthesis image data. Thereafter, in S405, the main controller 311 outputs a printing instruction to the printing engine unit 320, and the printing engine unit 320 executes printing in accordance with the instruction.

As described above, in a case where image data is not received within a standby period from reception time of previous image data, the image layout is determined with less than one line of standby images to be printed and printing is started. Therefore, printing can be started without making the user wait while preventing waste of paper.

Third Embodiment

In the present embodiment, an example will be described in which the images are arranged and then the printing is started for a case where an image having the length of the long side that exceeds the length of the printing region in the main scanning direction is included in the standby images. Hereinafter, differences from the first embodiment is mainly described, and descriptions of similar parts are omitted. Additionally, a part corresponding to the first embodiment is described by denoting the same references.

Figures 19A, 19B:
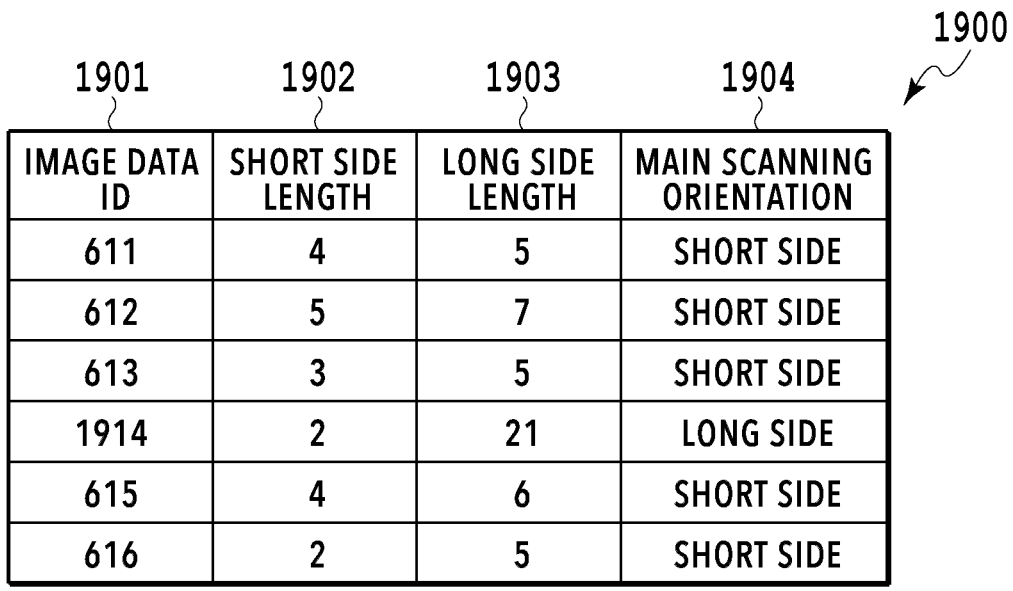

FIGS. 19A and 19B are tables illustrating examples of the image management table for managing the size and the orientation of the image. An image management table 1900 holds information including an image data ID 1901, an image short side length 1902, an image long side length 1903, and an image main scanning orientation 1904.

Figure 20:
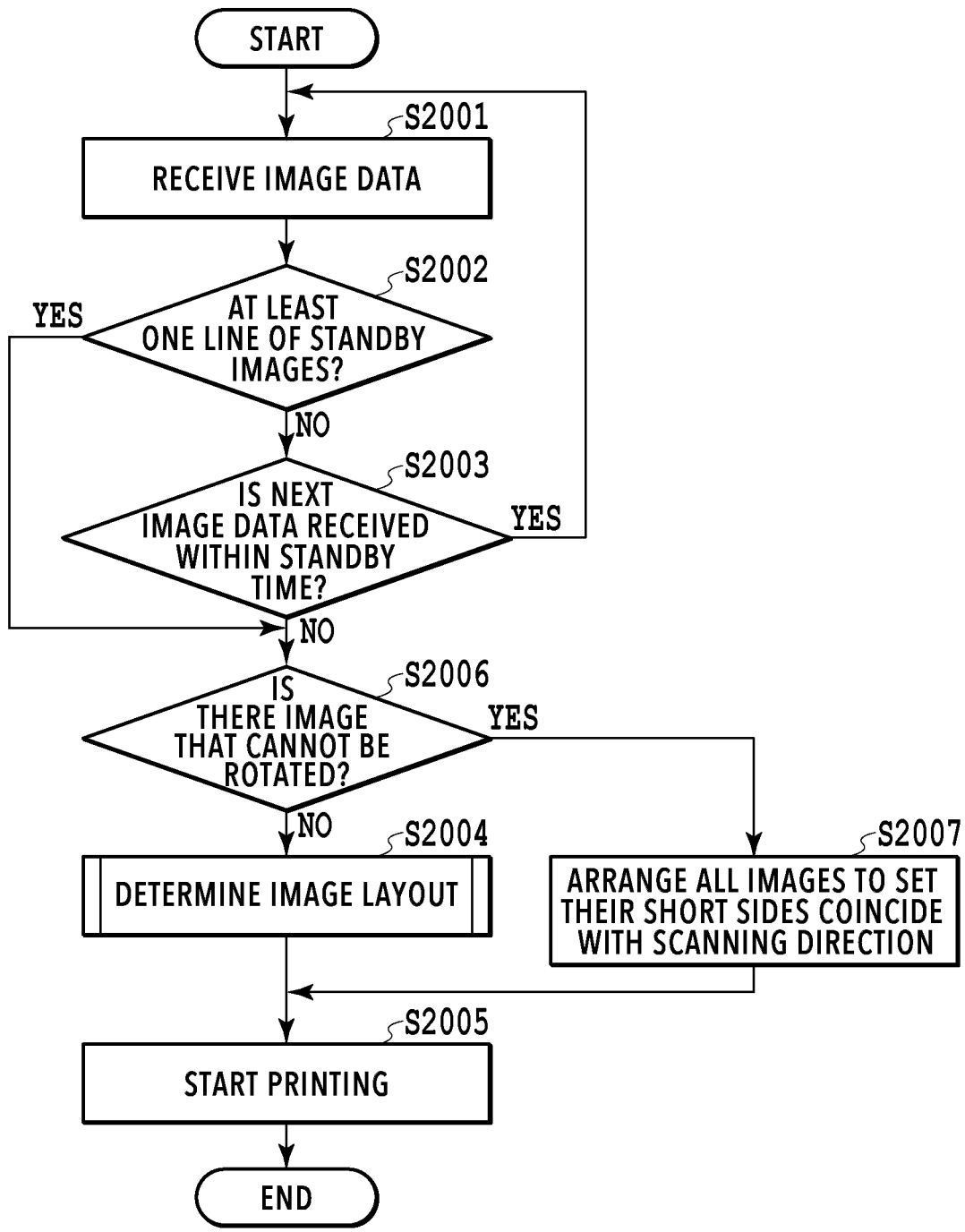
FIG. 20 is a flowchart illustrating an example of a method that starts with image data reception and ends with start of printing and that is performed by the image forming apparatus according to the third embodiment of the present disclosure.

FIG. 20 is a flowchart illustrating an example of a method that starts with image data reception and ends with start of printing and that is performed by the image forming apparatus 300. Since the processing from S2001 to S2005 is similar to the processing from S401 to S405 illustrated in FIG. 4, duplicated description is omitted.

In the present embodiment, the main controller 311 repeatedly executes S2001 to S2003 as with the first embodiment. Thus, the controller unit 310 receives the image data corresponding to the image 611 to the image data corresponding to the image 613 within respective predetermined standby times. When the controller unit 310 receives an image 1914 within a predetermined standby time from the reception of the image data corresponding to the image 613, since the length of the short side of the image 1914 is 2 as with the image 614, the total length of the short sides of the received images becomes 14. Accordingly, the controller unit 310 allows the processing to proceed to S2003. Additionally, after the controller unit 310 have received the images 615 and 616 within respective predetermined standby times, the total length of the short sides of the received images becomes 20. Accordingly, the main controller 311 allows the processing to proceed to S2006. In this case, the image management table 1900 transitions to the state of FIG. 19A.

In S2006, the main controller 311 determines whether there is an image that cannot be rotated in the standby images, and if there is the image that cannot be rotated, the main controller 311 allows the processing to proceed to S2007, while if there is no image that cannot be rotated, the main controller 311 allows the processing to proceed to S2004. Whether an image is the image that cannot be rotated is determined based on whether the long side of the image exceeds the length of the printing region in the main scanning direction or whether the long side of the image exceeds the sheet height. Note that, in a case where the sheet is continuous paper such as roll paper, whether an image is the image that cannot be rotated may be determined based on only whether the long side of the image exceeds the length of the printing region in the main scanning direction. In this case, the value of the long side length 1903 of the image 1914, which is 21, exceeds the value of the length of the printing region along the main scanning direction, which is 20; therefore, it is determined that it is impossible to rotate the image 1914, and the processing proceeds to S2007.

In S2007, the main controller 311 arranges all the images side by side such that the directions of the short sides of all the images coincide with the main scanning direction. With this arrangement, the image management table 1900 transitions to the state as illustrated in FIG. 19B. With control by the main controller 311, the controller unit 310 synthesizes the image data corresponding to the image 611 to the image data corresponding to the image 613, image data corresponding to the image 1914, image data corresponding to the image 615, and image data corresponding to the image 616 in accordance with the image management table 1400 having the contents illustrated in FIG. 19B and generates the synthesis image data. Thereafter, in S2005, the main controller 311 outputs the printing instruction to the printing engine unit 320, and the printing engine unit 320 executes printing in accordance with the instruction.

As described above, in a case where an image having the length of the long side that exceeds the length of the printing region along the main scanning direction is included in the standby images, a fixed image layout is applied, and printing is started. Therefore, printing can be started without making the user wait while preventing waste of paper.

Other Embodiments

A range of the printing region in the main scanning direction is determined by a predetermined method within a range of the width of the sheet. Accordingly, the positions of the boundary lines at both ends of the rectangular area in the main scanning direction vary depending on how the print region is set (that is, how to set the widths of the left and right margins sandwiching the print region). The printing region may be set over the entire width of the sheet in the main scanning direction. In this case, the boundary lines at the both ends of the rectangular region in the main scanning direction coincide with sides at the both ends of the sheet.

In the process of additionally arranging an image in the main scanning direction, a margin may be provided between the image and an image arranged immediately before. In this case, when executing the process of updating the total width of the images by adding the width of the current image to the total width of the images (S704), the length of each of the second and subsequent images in the main scanning direction should be changed to the length obtained by adding the width of the margin between images to the length of each of each of the second and subsequent images in the main scanning direction. It is unnecessary to change other steps. Additionally, it is unnecessary to revise the calculation expression in the calculation of the margin area (S709).

In a case where no gap is provided between additional image and an image arranged immediately before when arranging the additional image in the main scanning direction, a total width X1 is:

$$X1 = x1 + x2 + x3 + \ldots + xn.$$

In contrast, in a case where a gap is provided between additional image and an image arranged immediately before when arranging the additional image in the main scanning direction, a total width X2 is:

$$X2 = x1 + g + x2 + g + x3 + \ldots + xn = X1 + (n-1) \cdot g.$$

The present disclosure can be applied to an image having a shape other than a rectangle. The long side direction and the short side direction in this case are a long side direction and a short side direction of a rectangle that circumscribes the image having a shape other than a rectangle and that has sides in the main scanning direction and the sheet conveyance direction. For example, if the image having a shape other than a rectangle is an oval or a polygon, the long side direction and the short side direction of the image is a long side direction and a short side direction of a rectangle that circumscribes the image and that has sides in the main scanning direction and the sheet conveyance direction.

In FIG. 6, the images 611 to 615 are arranged such that upper sides of the images coincide with one another; however, the images 611 to 615 may be arranged such that lower sides of the images coincide with one another. Additionally, the positions of the images 611 to 615 in the sheet conveyance direction may be adjusted within a range of the two types of arrangement.

In the method illustrated in FIG. 7, the images are confirmed in the order of reception; however, it is possible to confirm the images in another order. For example, the images may be confirmed in the opposite order of reception, or the images may be confirmed in random order. Additionally, S701 to S710 may be repeated for the multiple orders. Thereafter, the margin areas corresponding to the combinations selected in the S710 for multiple orders may be compared with one another, a set of the order and the combination of rotations corresponding to the minimum margin area may be selected, and the images may be arranged side by side in accordance with the selected set of order and the combination of the rotations.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-117043, filed on Jul. 22, 2022 which is hereby incorporated by reference wherein in its entirety.

What is claimed is:

1. An image arrangement apparatus that arranges a plurality of images for nesting printing, in which images are printed side by side in a main scanning direction that intersects a sheet conveyance direction, comprising:
a first arrangement unit configured to arrange the plurality of images side by side in the main scanning direction such that either one of a long side direction and a short side direction of each image included in the plurality of images coincides with the main scanning direction in accordance with a combination of respective rotations of images included in the plurality of images and also such that the plurality of images are contained in a rectangular region defined based on the combination;
a calculation unit configured to calculate an area of a margin that is a part of the rectangular region, the part being where the plurality of images arranged by the first arrangement unit are not present; and
a selection unit configured to select one of a plurality of the combinations based on the area of the margin corresponding to each combination.

2. The image arrangement apparatus according to claim 1, wherein
a length of the rectangular region in the sheet conveyance direction is defined based on the combination defining the rectangular region, and a long side length and a short side length of each of the plurality of images.

3. The image arrangement apparatus according to claim 1, wherein
a length of the rectangular area in the sheet conveyance direction is defined by a longest length out of respective lengths of images included in the plurality of images, each of the lengths being a length of either one of a long side and a short side of each image included in the plurality of images, a direction of the either one coinciding with the sheet conveyance direction in accordance with the combination.

4. The image arrangement apparatus according to claim 1, wherein
a length of the rectangular area in the main scanning direction is defined based on a printing region.

5. The image arrangement apparatus according to claim 1, wherein
the sheet conveyance direction coincides with a direction in which a sheet as a printing medium is conveyed.

6. The image arrangement apparatus according to claim 1, wherein
the calculation unit obtains the area of the margin by subtracting a total area of the plurality of images contained in the rectangular region from an area of the rectangular region.

7. The image arrangement apparatus according to claim 1, wherein
the number of the plurality of images depends on the combination.

8. The image arrangement apparatus according to claim 7, wherein
the number of the plurality of images is a smaller number out of the number of images prepared for arrangement by the first arrangement unit and the maximum number of images that can be arranged side by side so as to be contained in the rectangular region along the main scanning direction while setting either one of the short side direction and the long side direction to coincide with the main scanning direction in accordance with the combination.

9. The image arrangement apparatus according to claim 8, wherein
the images prepared for arrangement by the first arrangement unit are images that are arranged side by side in the main scanning direction such that the short side direction of each image coincides with the main scanning direction until a total length of respective short sides of the arranged images becomes equal to or greater than the length of the rectangular region along the main scanning direction.

10. The image arrangement apparatus according to claim 9, wherein
in a case where data of a next image to be arranged is not received within a predetermined standby time before the total length of respective short sides of the arranged images becomes equal to or greater than the length of the rectangular region along the main scanning direction, the images prepared for arrangement by the first arrangement unit are images arranged side by side in the main scanning direction until the next image is not received within the predetermined standby time.

11. The image arrangement apparatus according to claim 1, wherein
the selection unit selects a combination for which the area of the margin is the minimum out of the plurality of the combinations.

12. The image arrangement apparatus according to claim 11, wherein
in a case where there are a plurality of combinations for which the area of the margin is the minimum, the selection unit selects a combination that satisfies a predetermined condition out of the plurality of combinations for which the area of the margin is the minimum.

13. The image arrangement apparatus according to claim 12, wherein
the predetermined condition is any one of or a combination of a predetermined condition related to the number of a plurality of images, a predetermined condition related to an area of the rectangular region, a predetermined condition related to the number of rotated images, and a predetermined condition related to an ID of the combination.

14. The image arrangement apparatus according to claim 1, wherein
the main scanning direction coincides with a direction in which a printing head for printing is reciprocally moved.

15. The image arrangement apparatus according to claim 1, wherein
the first arrangement unit arranges the plurality of images side by side in the main scanning direction so as not to cause a gap between the images or so as to cause a predetermined margin between the images.

16. The image arrangement apparatus according to claim 1, wherein in a case where a length of a long side of at least one of the plurality of images exceeds a length of the rectangular region along the main scanning direction, the selection unit selects a combination in which a short side direction of each image included in the plurality of images coincides with the main scanning direction.

17. The image arrangement apparatus according to claim 1, further comprising:
a second arrangement unit configured to arrange the plurality of images side by side in the main scanning direction such that either one of a long side direction and a short side direction of each image included in the plurality of images coincides with the main scanning direction in accordance with the combination selected by the selection unit and also such that the plurality of images are contained in the rectangular region defined based on the combination selected by the selection unit.

18. The image arrangement apparatus according to claim 17, wherein
the second arrangement unit arranges the plurality of images side by side in the main scanning direction so as not to cause a gap between the images or so as to cause a predetermined margin between the images.

19. An image forming apparatus, comprising:
an image arrangement apparatus according to claim 17; and
a printing engine unit configured to print the plurality of images arranged by the second arrangement unit.

20. A method of arranging a plurality of images for nesting printing, in which images are printed side by side in a main scanning direction that intersects a sheet conveyance direction, comprising:
arranging the plurality of images side by side in the main scanning direction such that either one of a long side direction and a short side direction of each image included in the plurality of images coincides with the main scanning direction in accordance with a combination of respective rotations of images included in the plurality of images and also such that the plurality of images are contained in a rectangular region defined based on the combination;
calculating an area of a margin that is a part of the rectangular region, the part being where the plurality of images arranged by the arranging are not present; and
selecting one of a plurality of the combinations based on the area of the margin corresponding to each combination.

21. A non-transitory computer readable storage medium storing a program causing a computer to execute a method of arranging a plurality of images for nesting printing, in which images are printed side by side in a main scanning direction that intersects a sheet conveyance direction, the method comprising:
arranging the plurality of images side by side in the main scanning direction such that either one of a long side direction and a short side direction of each image included in the plurality of images coincides with the main scanning direction in accordance with a combination of respective rotations of images included in the plurality of images and also such that the plurality of images are contained in a rectangular region defined based on the combination;
calculating an area of a margin that is a part of the rectangular region, the part being where the plurality of images arranged by the arranging are not present; and
selecting one of a plurality of the combinations based on the area of the margin corresponding to each combination.

* * * * *